United States Patent Office 3,398,074
Patented Aug. 20, 1968

3,398,074
METHOD OF MANUFACTURING IMPROVED POLYOXYMETHYLENE GRAFT COPOLYMERS USING RADIATION
Tamotsu Eguchi and Takuji Okaya, Kurashiki, Japan, assignors to Kurashiki Rayon Co., Ltd., Kurashiki, Japan
No Drawing. Filed Sept. 27, 1965, Ser. No. 490,731
Claims priority, application Japan, Oct. 8, 1964, 39/57,061
3 Claims. (Cl. 204—159.15)

This invention relates to a method of manufacturing novel and improved graft copolymers of polyoxymethylene copolymers which comprises grafting polyoxymethylene copolymers having good thermal stability with vinyl compounds.

As is well known, polyoxymethylene copolymers obtained by copolymerizing formaldehyde or trioxane with a compound such as alkyleneoxide having adjacent carbon-carbon linkage in the main chain of molecule which is free from instable parts to heat, not only retain the advantages inherent properties of polyoxymethylene but also gain improvements in thermal stability, moldability and other properties over polyoxymethylenes which are formed by stabilization of end groups of a polyoxymethylene homopolymer as by acetylation. However, there are still many points to be improved in the quality of polyoxymethylene copolymers.

The principal object of the invention is to manufacture novel and improved graft copolymers of polyoxymethylene copolymers.

Another object of the invention is to obtain moldings having good moldability, impact strength, and dyeability.

A further object of the invention is to obtain filaments having satisfactory dyeability, bulkiness, elasticity, pilling tendency, Young's modulus, and crimping stability.

Still further objects, advantages and features of the invention will become apparent to those skilled in the art from the following detailed description of the invention.

According to the present invention, polyoxymethylene copolymers having good thermal stability and containing from 0.1 to 15 molar percent of a comonomer having carbon-carbon linkage are grafted with vinyl compounds through irradiation with ionizing radiation, whereby modified copolymers can be obtained without affecting in the least the excellent thermal stability of polyoxymethylene copolymers.

A method of grafting a polyoxymethylene homopolymer as a trunk polymer with a vinyl compound through irradiation with an ionizing radiation is publicly known, for example, by Japanese patent application publication No. 7,892/1963.

However, polyoxymethylene homopolymers have a tendency for decomposition, that is, rupture of the main chain, upon irradiation with an ionizing radiation source. Accordingly, graft copolymers obtained by grafting polyoxymethylene homopolymers and those whose terminal groups have been esterified, etherified, or otherwise treated for stabilization, with vinyl compounds through ionizing radiation have such poor thermal stability that it is highly difficult to manufacture moldings therefrom.

The trunk polymers used in the invention are polyoxymethylene copolymers, or substances different from polyoxymethylene homopolymers. Typical of the copolymers are, as defined in the specification of U.S. Patent No. 3,027,352, polyoxymethylene copolymers containing from 0.1 to 15 molar percent of a unit of the general formula

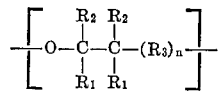

Resulting from the opening of a cyclic ether of the general formula

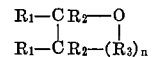

wherein $R_1$ and $R_2$ represent hydrogen atoms, or alkyl or alkyl derivative radicals; and $R_3$ represents a methylene, oxymethylene, or methylene derivative radical. An important reason for which the above copolymers are distinguished from pure polyoxymethylene homopolymer is that, whereas pure polyoxymethylene homopolymer has very poor thermal stability and is not adapted for use as moldings or fibers unless the terminal groups are stabilized, the polyoxymethylene copolymers as above defined are capable of use without stabilization of terminal groups.

In the present invention, thermal stability of polyoxymethylene is expressed in terms of the rate of weight loss upon heating of a polyoxymethylene containing 0.5% of diphenylamine and 0.5% of copolyamide (commercially available with a trade name "X4001" for Toyo Rayon Co.), in the presence of air at 222° C., that is, $K'_{222}$ in percent per minute. The less the $K'_{222}$ value, the greater is the thermal stability.

When, under the invention, reprecipitated powders of polyoxymethylene copolymers which possess good thermal stability even with instable terminal groups are used as starting materials or as trunk polymers, and are subjected to ionizing radiation and grafted with vinyl compounds, the polyoxymethylenes show little weight loss during irradiation. Powders of graft copolymers thus obtained invariably have good thermal stability, such as the $K'_{222}$ range of 0.01–0.03%/min. They can be molten and molded by injection molding or extrusion machine with practically no possibility of decomposition. Also they can be spun by melt spinning machine into uniform filaments without any rupture of the filaments in the spinning cells. On the contrary, a reprecipitate of pure polyoxymethylene diacetate treated in the same way shows a noticeable weight loss during irradiation, and the resulting graft copolymer has too poor thermal stability for practical applications.

It will be illustrated by the following test results. A polyoxymethylene copolymer (trade name Duracon M90–01 of Poly Plastics Co.) containing about 2 molar percent of oxyethylene groups and having an intrinsic viscosity ($\eta$) of 1.46 as determined in parachlorophenol containing 2% of $\alpha$-pinene at 60° C. and a $K'_{222}$ value of 0.005%/min., and a polyoxymethylene homopolymer (trade name Delrin 500 of Du Pont) whose ($\eta$) is 1.48 and whose $K'_{222}$ is 0.018%/min., were both irradiated with $0.5 \times 10^6$ irradiation of electrons in the presence of air. These irradiated polymers were impregnated with methyl methacrylate in a nitrogen atmosphere at 40° C. and graft copolymers having the graft ratios given in the following table were prepared. Thermal stability values of the irradiated polymers and graft copolymers were as shown in the table below. A graft copolymer prepared by grafting polyoxymethylene homopolymer (Delrin 500) with methyl methacrylate decomposed badly in the course of molding and involved much difficulty in the process.

| Polyoxy-methylene | After irradiation | | After grafting | | |
|---|---|---|---|---|---|
| | Wt. loss (percent) | $K'_{222}$ (percent/min.) | Graft ratio (percent) | $K'_{222}$ (percent/min.) | Moldability |
| Duracon M90–01 | 0.2 | 0.02 | 17 | 0.02 | Good. |
| Delrin 500 | 1.9 | 0.10 | 20 | 0.09 | Not good. |

For the purpose of the present invention, polyoxymethylene copolymers having good thermal stability mean those which contain from 0.1 to 15 molar percent of a comonomer having adjacent carbon-carbon linkage in the main chain and from which oxymethylene radicals having terminal OH groups instable to heat are dissolved away. The type of copolymerization of the polyoxymethylene copolymers may be either random copolymerization or block copolymerization, but the former is preferred when the comonomer content is limited, say within a range from 0.1 to 2 molar percent.

The above copolymers are prepared by copolymerizing formaldehyde, trioxane, or tetraoxane with alkylene oxide, cyclic formal, or vinyl monomer. Alkylene oxides for use in the invention include ethylene oxide, propylene oxide, 1,2-butylene oxide, pentamethylene oxide, and styrene oxide. Cyclic formals include 1,3 - dioxolane, 1,3,5 - trioxepane, 1,3-dioxane, 4-phenyl-1,3-dioxane, and 2-phenyl-1,3-dioxane. Vinyl monomers include styrene, isobutylene, ethylvinylether, and vinyl pyridine.

In the invention, the useful polyoxymethylene copolymers are not limited to binary copolymers, but ternary and quaternary copolymers may also be used as trunk polymers. For the purpose of graft copolymerization, those copolymers having degree of polymerization of not less than 500, from which thermally instable parts have been removed by basic material are used. Such thermally stable polyoxymethylene copolymers may be powdery, filmy, chip-like, or any other form, but are most readily grafted in the form of powder.

In the present invention, the ionizing radiation includes $\gamma$-rays, $\alpha$-rays, $\beta$-rays, X-rays, electrons, neutrons, heavy particles, etc. These rays may be used in combination. The irradiation temperature varies with the object, but usually ranges from $-80°$ C. to $+80°$ C. Suitable irradiation dose is between $10^4$ and $5 \times 10^7$ roentgens. In many cases the dose rate may be disregarded, but in case of simultaneous irradiation, the preferred range is from $1 \times 10^3$ to $1 \times 10^{10}$ roentgens per hour.

The term "simultaneous irradiation method" used herein means a method wherein a polyoxymethylene copolymer having good thermal stability is added with a vinyl compound alone or a solution of a vinyl compound and other substance and the mixture is subjected to ionizing radiation in the absence of oxygen. If the vinyl compound is in a liquid form under the conditions of grafting reaction, the polyoxymethylene copolymer may be subjected to the ionizing radiation while being impregnated with said liquid vinyl compound. It is also possible to effect the graft reaction with ionizing radiation while the polyoxymethylene copolymer is immersed in a solvent solution of a vinyl compound which occurs either in liquid or gaseous form. If in the latter case the solvent used produces free radicals as the mixture is subjected to ionizing radiation, the free radicals will initiate polymerization of the vinyl compound, and hence the amount of homopolymer of the vinyl compound will increase. Such a phenomenon can be avoided by suitable selection of the solvent to be used, for example by the use of insensitive solvents such as benzene or toluene. It is further practicable to carry out the ionizing radiation on a polyoxymethylene copolymer coated or wetted on the surface with a vinyl compound.

The term "pre-irradiation method" used herein means a method which comprises subjecting a polyoxymethylene copolymer to an ionizing radiation in the presence or absence of oxygen, contacting the irradiated polymer with a vinyl compound or a mixed solution of said vinyl compound and other substance in the absence of oxygen, and heating them together. Trunk polymers irradiated in the air have longer storage life than those irradiated in a vacuum. Simultaneous irradiation gives a relatively large amount of homopolymer of grafting material.

In the present invention, the vinyl compounds to be used as grafting materials mean radical polymerizable vinyl monomers. They include, for example: esters of acrylic acid and methacrylic acid with saturated monohydric or polyhydric aliphatic or cycloaliphatic alcohols preferably containing one to eight carbon atoms such as methyl, ethyl, propyl, and butyl acrylates and methacrylates; acrylic and methacrylic acid amides and also their derivatives; acrylonitrile and methacrylonitrile; $\alpha$-, $\beta$-unsaturated monocarboxylic acid such as acrylic and methacrylic acid and their halogen-substituted products such as $\alpha$-halogen acrylic acids; vinyl esters such as vinyl acetate, vinyl propionate, and vinyl butyrate; aromatic or heterocyclic monovinyl or polyvinyl compounds such as styrene, styrene alkylated in the nucleus or on the side chain, styrene halogenated in the nucleus or on the side chain, divinyl benzene, and triallyl cyanurate; compounds containing two conjugated double bonds which preferably contain one to six carbon atoms such as 1,3-butadiene, isoprene, dimethyl butadiene and 2-chloro-1,3-butadiene; vinyl halides such as vinyl chloride and vinylidene chloride; and $\alpha,\beta$-unsaturated aldehydes such as acrolein and methacrolein. Other useful vinyl compounds include vinyl pyridine, vinyl pyrrolidone, acrylamide, and potassium styrene sulfonate.

The above monomers may be used singly or in combination of more than two. In contacting a polyoxymethylene copolymer with a grafting material, the latter may be used as such or in the form of a suitable solution. Direct use of the grafting material is particularly suitable when the material occurs in substantially liquid form under the conditions of reaction, but if the material is available in a gaseous form, the vapor may also be employed.

If a solution of the grafting material is to be used, the solvent should be substantially inert to the action of free radicals. As suitable solvents, mention may be made, for example, of benzene, hexane, toluene, ethyl acetate, ether, dioxane, methanol, ethanol, isopropanol, and the like. Water is a good solvent for certain types of monomers. While there is no limit in the amount of vinyl compound to be added to polyoxymethylene copolymer, care should be taken not to cause any sharp drop of grafting efficiency due to heat generation by homopolymerization of monomer or chain transfer. Suitable polymerization temperature is between $-80°$ C. and $160°$ C., preferably between $0°$ C. and $100°$ C.

The time required for graft copolymerization ranges from several minutes to several tens of hours, depending on the dose of ionizing radiation, polymerization temperature, and the nature of the polymer desired.

The degree of grafting of a vinyl compound to polyoxymethylene is herein expressed in terms of graft ratio, that is, the ratio in percentage of the balance obtained as subtraction of the weight (A) of starting material or polyoxymethylene copolymer from the weight (B) of the copolymer formed by graft copolymerization, to the weight (A).

In short, $$\frac{B-A}{A} \times 100 = \text{graft ratio}$$

While the graft ratio should be suitably varied depending on the type of grafting material, properties to be given to polyoxymethylene, and the desired extent of improvement, usually the ratio within a range of 0.5–200% is preferable. The graft ratio within the above range is not merely obtained by the above graft copolymerization, but can also be attained by blending the graft copolymer with additional polyoxymethylene copolymer.

In the present invention, the term "graft copolymers" means in addition to graft copolymers of pure polyoxymethylene copolymer (which may take the form of block copolymers of polyoxymethylene copolymers and polymers of vinyl compounds), those containing limited amounts of non-grafted polyoxymethylene copolymers and polymers of vinyl compounds.

In order to improve the stability of the graft copolymer obtained as an end product in accordance with the invention, it is advisable to add known antioxidants, stabilizers to heat and light, etc. to the copolymer to enhance the thermal stability of the copolymer in the molten state and to increase the stability of moldings or fibers. Those mentioned hereunder are particularly effective stabilizers to be used as additives in the method of the invention:

(1) Useful antioxidants are primary, secondary, and tertiary amines and phenol derivatives, which are added preferably in an amount of from 0.01 to 10% by weight. The effective amine compounds include N, N, N', N'-monohydroxy-alkyl-alkylene diamine, diphenylamine, and phenyl-β-naphthylamine. The phenol derivatives include phenols of the formula

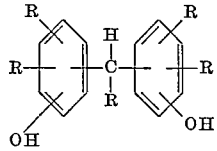

(wherein R denotes an alkyl radical), hydroquinone derivatives, β-naphthol derivatives, and bisphenol derivatives.

(2) Useful thermal stabilizers are nitrogen-containing high polymers such as polyamides, polyamide terpolymers, polyurethanes, polyureas, polyvinyl pyrrolidone, and polyacrylamide; hydrazines (including substituted hydrazones and hydrazides); ureas; and thioureas.

Also available for the purpose are mercaptothiazoles of the formula

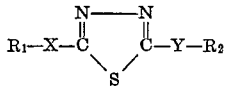

(wherein $R_1$ and $R_2$ denote hydrogen or alkyl radicals, and X and Y sulfur or sulfonyl radicals), sulfonamides of the formula $R$—$(SO_2NH_2)_n$ (wherein $n$ denotes an integer between 2 and 4, and R, an alkyl radical), and sulfur compounds of the formula $R$—$S$—$R'$, $R$—$(S)_n$—$R'$ (wherein R and R' denote alkyl radicals) or following formula

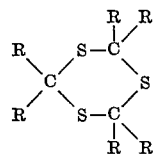

(wherein R denotes alkyl radicals).

The thermal stabilizer is advantageously used in an amount of 0.01 to 10% of the total amount of the polymer.

(3) Light stabilizers include orthohydroxybenzophenone of the formula

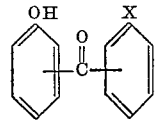

(wherein X denotes hydrogen or hydroxyl radical), alkylsalicylate derivatives, and pulverous carbon black. The stabilizer is added in an amount of from 0.01 to 3% to the polymer.

According to the invention, there is no limitation in the types of radical polymerizable vinyl compounds to be grafted to polyoxymethylene copolymers, and a suitable compound should be selected on the basis of properies required for graft copolymer. Monomers which are capable of improving impact strength, elasticity, and moldability of the end products in the form of moldings are conjugated diolefin mixtures of conjugated diolefins with vinyl monomers such as styrene and acrylonitrile, and acrylic acid esters containing more than two carbon atoms in the ester groups. Graft ratios of these monomers to polyoxymethylene are preferably within a range of 1.5–120%. Polyoxymethylene copolymers grafted with acrylonitrile and methacrylonitrile, when spun into filaments, can have improved bulkiness, crimp stability, and dyeability, and also an increase of softening point by more than several degrees centigrade. Preferable graft ratio ranges from 1.0 to 40%. Polyoxymethylene copolymers grafted with acrylamide and vinyl pyrrolidone also acquire improved dyeability in the form of filaments. Those grafted with methyl methacrylate are readily moldable and afford highly transparent moldings.

The invention is illustrated by the following examples, in which (η) represents the intrinsic viscosity of polymer determined in parachlorophenol containing 2% of α-pinene, at 60° C.

Example 1

A polyoxymethylene copolymer having hydroxybutyl groups in both terminations and containing 2.5 molar percent of oxybutylene groups was pressed at 190° C. to a piece of film, 6 cm. long, 1.5 cm. wide, and 150 μ thick (weighing 1.890 g.), and the sheet was irradiated with γ-rays at a dose rate of $1.52 \times 10^4$ roentgens per hour in the presence of air at room temperature for 85 hours. The total irradiation dose was $1.29 \times 10^6$ roentgens. The irradiated piece was placed in a test tube, to which 20 cc. of methyl methacrylate were added, and the tube was degased by reducing the pressure, and sealed. After heating at 60° C. for 8 hours, the film was taken out, thoroughly washed with methanol, and dried. It weighed 2.105 g., or 11.4 percent more than the original weight.

Example 2

One hundred grams of chips of Duracon M90–01 on sale by Poly Plastics Co. (presumed to be a copolymer of trioxane and ethylene oxide, containing about 2 molar percent of ethylene oxide, (η)=1.46, $K'_{222}$=0.005%/min.) were irradiated with $1 \times 10^6$ roentgens of electrons in the presence of air at room temperature. Next, the test material was placed in a test tube having a diameter of 3 cm., and nitrogen gas was passed through the tube for 10 minutes. Then, 75 cc. of methyl acrylate were added, the gas inside the tube was replaced by nitrogen gas over a period of 10 minutes, and the tube was hermetically sealed. The tube was heated at 60° C. for 4 hours, washed with methanol after cooling, and dried to obtain 120 g. of polymer. The graft ratio was 20%. To the polymer, nylon and diphenylamine were added in amounts of 0.5% each, and then the $K'_{222}$ value was determined to be 0.018. To the resultant, 0.5% of polyurethane and 0.5% of dicyanodiamine were added, and the mixture was blended in blending rolls and molded by a press. Then a test piece for impact strength was cut off from the product in conformity to ASTM D–256, and was tested by an Izod impact tester. The value obtained was 5.5 ft. lb./in., or much greater than that of non-grafted test piece which was 1.5 ft. lb./in. Thermal decomposition during molding was negligible.

As contrast, a similar test was run with chips of Delrin 500 made by Du Pont (acetylated formaldehyde homopolymer, (η)=1.48, $K'_{222}$=0.02%/min.). After irradiation the polymer lost 3.4% of its weight. The $K'_{222}$ value determined with respect to the resultant after grafting was 1.5%/min. In the course of melting in blending rolls, the resultant gave off such offensive smell of formalin that further operation had to be abandoned.

Example 3

Commercially available chips of Duracon M90–01 was reprecipitated from 8% dimethyl formamide solution, and 90 g. of powder thus obtained were irradiated with $2 \times 10^5$ roentgens of electrons in the presence of air at room temperature, and then placed in a flask. To the irradiated powder, 25 cc. of vinyl pyridine, and 200 cc. of benzene were added. The mixture was solidified by cooling to −78° C., degased, and warmed to room temperature. After repeating this procedure four times, the tube was sealed and heated on water bath at 80° C. for 5 hours. The resultant on thorough washing with methanol and drying gave 91.8 g. of a polymer. The graft ratio was 2%. With the addition of diphenylamine and nylon in amounts of 0.5% each, the polymer was determined to have a $K'_{222}$ value of 0.01%/min.

Next, a mixture consisting of 90 g. of the above polymer, 0.5 g. of polyurethane (Durethan Uo, the trade name of a polyaddition product of tetramethylene glycol and tetramethylene diisocyanate, sold by Bayer of West Germany), and 0.5 g. of dicyanodiamine was melt spun by a small-size melt spinning machine having a nozzle provided with 10 holes, at a temperature of 190° C. and the resulting filaments were stretched at 150° C. to lengths four times the original dimensions.

In a test for dyeability with an acid dyestuff Acid Brilliant Scarlet 3R (C.I. 16255), the fiber was dyed very deeping the exhaustion of the dye being 93%. By contrast, Duracon M90–01 treated and spun into filaments in the similar manner did not accept the dye, the exhaustion of the dye being 0.5%.

Then, Delrin 500 was powdered and subjected to graft copolymerization in the entirely same manner as above. The $K'_{222}$ value was 0.08%/min. During melt spinning it gave off a smell of formalin, and rupture of single filament was so frequent that no filament longer than 2 cm. was obtained.

Example 4

Three grams of powder of Duracon M90–01, 9 cc. of styrene, and 6 cc. of methanol were introduced in a test tube. After repeated degasing cycles, the tube was sealed and irradiated with an ionizing source at a dose rate of $1.5 \times 10^4$ roentgens per hour at room temperature for 10 hours.

Next, the resultant was extracted with benzene for 24 hours, thoroughly washed with methanol, and dried, after which it weighed 3.3 g. The graft ratio was 10%. To 0.5 g. of the polymer containing the grafted product were added nylon and diphenylamine in amounts of 0.5% each, and then the $K'_{222}$ value was 0.007%/min.

Example 5

Ninety grams of powdery Duracon M25–01 (trade name of a polyoxymethylene copolymer containing about 2 molar percent of oxyethylene groups, $(\eta)=1.70$, $K'_{222}=0.006$%/min. made by Poly Plastics Co.) were fed in three polyethylene bags, each bag containing 30 g. of Duracon M25–01. After the air inside the containers was thoroughly replaced by nitrogen gas, the contents were irradiated with electrons in a dose of $1.6 \times 10^6$ roentgens at room temperature, and stored at −78° C. Into each of three pressure bottles cooled to −30° C. were introduced 5 cc. of methyl methacrylate, 50 g. of butadiene, and 60 cc. of methanol and the air inside the bottle was replaced by nitrogen gas. Next, the irradiated Duracon was added thereto and each bottle was sealed mechanically, and allowed to stand at 15° C. for two full days. Then, the contents in the three bottles were put together, thoroughly washed with methanol, and dried, to obtain 102 g. of a polymer. The graft ratio was 13.3%. The $K'_{222}$ value of the polymer determined after the addition of nylon and diphenylamine was 0.009%/min. When tested for impact strength in the same manner as described in Example 2, the product gave a value as high as 8.7 ft. lb./in.

Example 6

Five grams of a copolymer (containing about 4 molar percent of oxyethylene groups, $(\eta)=0.95$, $K'_{222}=0.003$%/min.) prepared from 1,3-dioxolane and formaldehyde were subjected, soon after the polymerization, to ionizing radiation with $5 \times 10^6$ roentgens of electrons in the presence of air at room temperature. To the irradiated copolymer were added 20 g. of methyl methacrylate, and after degasing, the mixture was heated at 60° C. for 5 hours to obtain 12.2 g. of a polymer, which was extracted with chloroform by a Soxhlet apparatus for 24 hours to obtain 2.1 g. of a polymer in the chloroform-soluble part. The graft ratio of the graft copolymer was 102%. To the chloroform-insoluble part of polymer were added nylon and diphenylamine in amounts of 0.5% each. The $K'_{222}$ value determined was 0.07%/min. The resultant was treated in benzyl alcohol containing 0.5% of tributylamine at 160° C. for 30 minutes, and the $K'_{222}$ was determined in the same manner as above to be 0.02%/min.

Example 7

One hundred grams of powdery formaldehyde copolymer containing 1.0 molar percent of 1,4-butanediol formal and having a molecular weight of $6.15 \times 10^4$ were irradicated with $1 \times 10^6$ roentgens of electrons in the presence of nitrogen at 30° C. The irradiated powder was dipped in a mixture consisting of 500 g. of acrylonitrile and 150 g. of butadiene, degased, and allowed to stand at 30° C. for 10 hours to obtain 130 g. of a graft copolymer. To the resultant were added 0.3 g. of dicyanodiamide, 0.3 g. of diphenylamine, and 0.3 g. of 2,2'-methylene-bis(4-methyl-6-tert. butyl) phenol as antioxidant. The $K'_{222}$ value of the resulting powdery mixture was 0.01%/min. and the apparent melting point was 187° C. This powdery mixture was spun by a small-size melt spinning machine at 200° C., taken up on a bobbin in the form of a 15 denier filament, and stretched at 150° C. to a 2.0 denier filament. The filament had a dry strength of 7.56 g./d., Young's modulus of 50 g./d. and very good crimp stability after heat set. It was bulky and free from pilling due to wear. On the other hand, filament spun from the original non-irradiated copolymer has poor crimp stability and tended to develop pilling. Also, when powder of Delrin 500 was irradiated with electrons under the same conditions as above and grafted with acrylonitrile and butadiene in the same manner, the product was decomposed so vigorously that it could not be spun into filament.

What we claim is:

1. A method of manufacturing polyoxymethylene graft copolymers which comprises irradiating a thermally stable polyoxymethylene copolymer of a polymerization degree of not less than 500 which contains from 0.1 to 15 molar percent of a comonomer having carbon-carbon linkage selected from the group consisting of alkylene oxides, cyclic formal and vinyl monomers with from $10^4$ to $5 \times 10^7$ roentgens of ionizing radiation, and effecting graft copolymerization of the irradiated polymer by contact with a radically polymerizable vinyl compound with a graft ratio ranging from 0.5 to 200 percent.

2. A method as claimed in claim 1 wherein the polyoxymethylene copolymer subjected to ionizing radiation is contacted with the vinyl monomer in the absence of oxygen.

3. A method as claimed in claim 1 wherein the polyoxymethylene copolymer and vinyl monomer are contacted with each other in the absence of oxygen and subjected altogther to ionizing radiation.

References Cited

UNITED STATES PATENTS 3,027,352   3/1962   Walling et al. _____ 260—67

MURRAY TILLMAN, *Primary Examiner.*

R. B. TURER, *Assistant Examiner.*